(12) United States Patent
Tang

(10) Patent No.: US 7,175,332 B2
(45) Date of Patent: Feb. 13, 2007

(54) LIGHT GUIDE DEVICE HAVING IMPROVED LIGHT EFFICIENCY AND UNIFORMITY

(75) Inventor: Nai-Yuan Tang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 142 days.

(21) Appl. No.: 11/005,324

(22) Filed: Dec. 7, 2004

(65) Prior Publication Data

US 2006/0018129 A1    Jan. 26, 2006

(30) Foreign Application Priority Data

Jul. 21, 2004    (TW) .............................. 93121749 A

(51) Int. Cl.
*F21V 7/04* (2006.01)

(52) U.S. Cl. ...................... 362/616; 362/622; 362/615; 349/65

(58) Field of Classification Search ................ 362/615, 362/616
See application file for complete search history.

(56) References Cited

U.S. PATENT DOCUMENTS

| 4,798,448 | A | * | 1/1989 | van Raalte ................... 349/62 |
| 5,046,826 | A | * | 9/1991 | Iwamoto et al. ............... 349/62 |
| 5,390,276 | A | * | 2/1995 | Tai et al. ...................... 385/146 |
| 5,764,322 | A | * | 6/1998 | Mamiya et al. ................ 349/65 |
| 5,896,232 | A | * | 4/1999 | Budd et al. ................. 359/630 |
| 6,104,454 | A | * | 8/2000 | Hiyama et al. ................ 349/65 |
| 6,829,095 | B2 | * | 12/2004 | Amitai ........................ 359/630 |

FOREIGN PATENT DOCUMENTS

JP        11024587 A     *  1/1999

* cited by examiner

*Primary Examiner*—Ali Alavi
*Assistant Examiner*—Hargobind S. Sawhney
(74) *Attorney, Agent, or Firm*—Pillsbury Winthrop Shaw Pittman, LLP

(57) ABSTRACT

A light guide device includes a triangular prism unit and a plurality of quadrate prism units. The triangular prism unit has a first light entrance side, a first light exit side angled relative to the first light entrance side, and a first light transition interfacial side angled relative to the first light entrance side and the first light exit side. The first light transition interfacial side has a coating applied thereon. The quadrate prism units are connected optically to the triangular prism unit. Each of the quadrate prism units has a second light entrance side, a second light transition interfacial side opposite to the second light entrance side, and a second light exit side interconnecting the second light entrance side and the second light transition interfacial side. The second light transition interfacial side has a coating applied thereon.

8 Claims, 3 Drawing Sheets

LIGHT GUIDE DEVICE HAVING IMPROVED LIGHT EFFICIENCY AND UNIFORMITY

CROSS-REFERENCE TO RELATED APPLICATION

This application claims priority of Taiwanese Application No. 093121749, filed on Jul. 21, 2004.

BACKGROUND OF THE INVENTION

1. Field of the Invention

The invention relates to a light guide device, more particularly to a light guide device having improved light efficiency and uniformity.

2. Description of the Related Art

Referring to FIG. 1, a conventional light guide device 1 is shown to guide a light emitted from a light source 100 toward an optical surface 300 of a liquid crystal panel 200.

The conventional light guide device 1 includes a wedge body 11 having a light entrance side 12 proximate to the light source 100, a light reflection side 13, and a light exit side 14 opposite to the light reflection side 13. The light emitted from the light source 100 is incident upon the light entrance side 12 and enters the wedge body 11. The light reflection side 13 reflects fully the light impinging thereon back into the wedge body 11. The light exit side 14 reflects a portion of the light impinging thereon back to the light reflection side 13, and permits the other portion of the light to exit from the wedge body 11 so as to be supplied to the optical surface 300 of the liquid crystal panel 200.

In the conventional light guide device 1, the light exit side 14 is processed by etching or by forming v-cuts thereon so that a portion of the light impinging thereon can be reflected toward the light reflection side 13.

The conventional light guide device 1 can guide the light from the light source 100 toward the optical surface 300 of the liquid crystal panel 200. However, it is achieved on a basis of irregular light diffraction, in which the light efficiency is relative low on one hand, and the light distribution cannot be adjusted effectively for the light exit side 14 so as to transmit the light evenly onto the optical surface 300 of the liquid crystal panel 200 on the other hand.

Furthermore, the light used for the liquid crystal panel 200 should be one having specific polarization, such as p-type or s-type. This can be controlled by applying a polarizing coating on the light entrance side 12 or the light exit side 14. However, if the light entrance side 12 has a polarizing coating, the amount of the light entering the wedge body 11 is reduced to half of the light emitted from the light source 100. Therefore, the brightness of the light that reaches the liquid crystal panel 200 for subsequent operation will be insufficient due to light dissipation after repeated diffraction and reflection.

SUMMARY OF THE INVENTION

Therefore, it is an object of the present invention to provide a light guide device which has improved light efficiency and uniformity.

Accordingly, the light guide device according to this invention is used for guiding a light incident in a first direction toward an optical surface, and includes a triangular prism unit and a plurality of quadrate prism units.

The triangular prism unit has a first light entrance side, a first light exit side angled relative to the first light entrance side, and a first light transition interfacial side angled relative to the first light entrance side and the first light exit side. The first light transition interfacial side has a coating applied thereon.

The quadrate prism units are connected optically to the triangular prism unit. Each of the quadrate prism units has a second light entrance side, a second light transition interfacial side opposite to the second light entrance side, and a second light exit side interconnecting the second light entrance side and the second light transition interfacial side. The second light transition interfacial side has a coating applied thereon.

The quadrate prism units include a proximal quadrate prism unit which is proximate to the triangular prism unit and which has the second light entrance side in contact with the first light transition interfacial side. Each of the quadrate prism units has the second light transition interfacial side in contact with the second light entrance side of the other one of the quadrate prism units except the proximal quadrate prism unit. The first and second light exit sides face the optical surface.

The coating of the first or second light transition interfacial side has a predetermined reflectance so that the first or second light transition interfacial side reflects a portion of light incident thereon toward the first or second light exit side and permits the other portion of the light to pass through the first or second light transition interfacial side. The reflectance of the coatings of the first and second light transition interfacial sides are increased in a direction from the triangular prism unit to one of the quadrate prism units which is farthest from the triangular prism unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
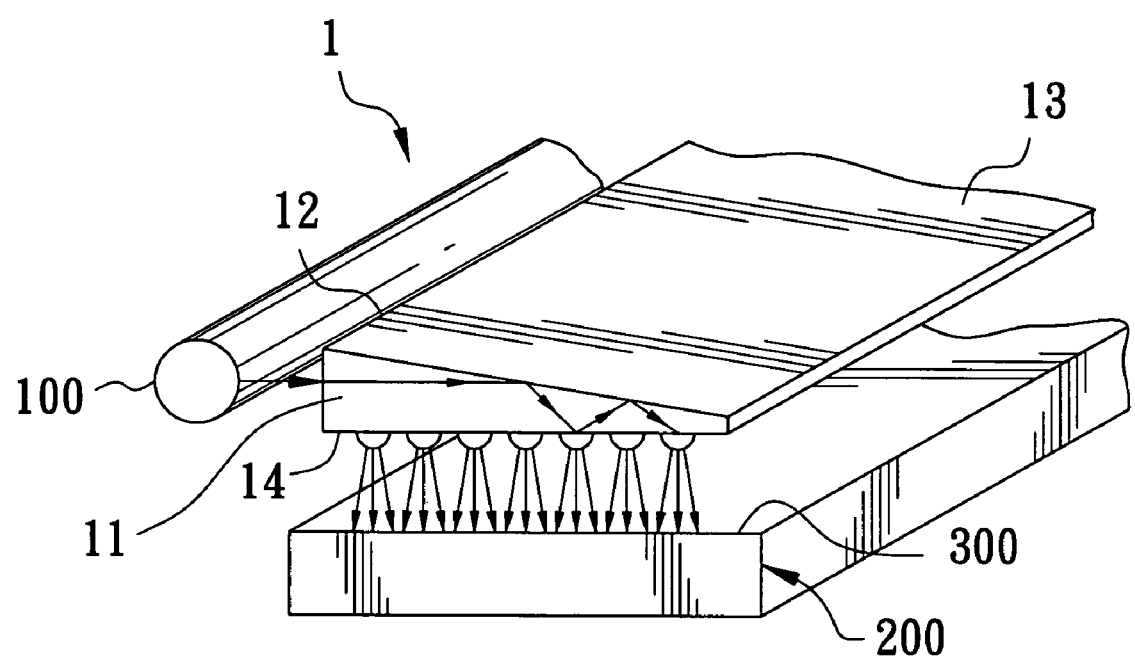
FIG. 1 is a perspective view of a conventional light guide device.
Figure 2:
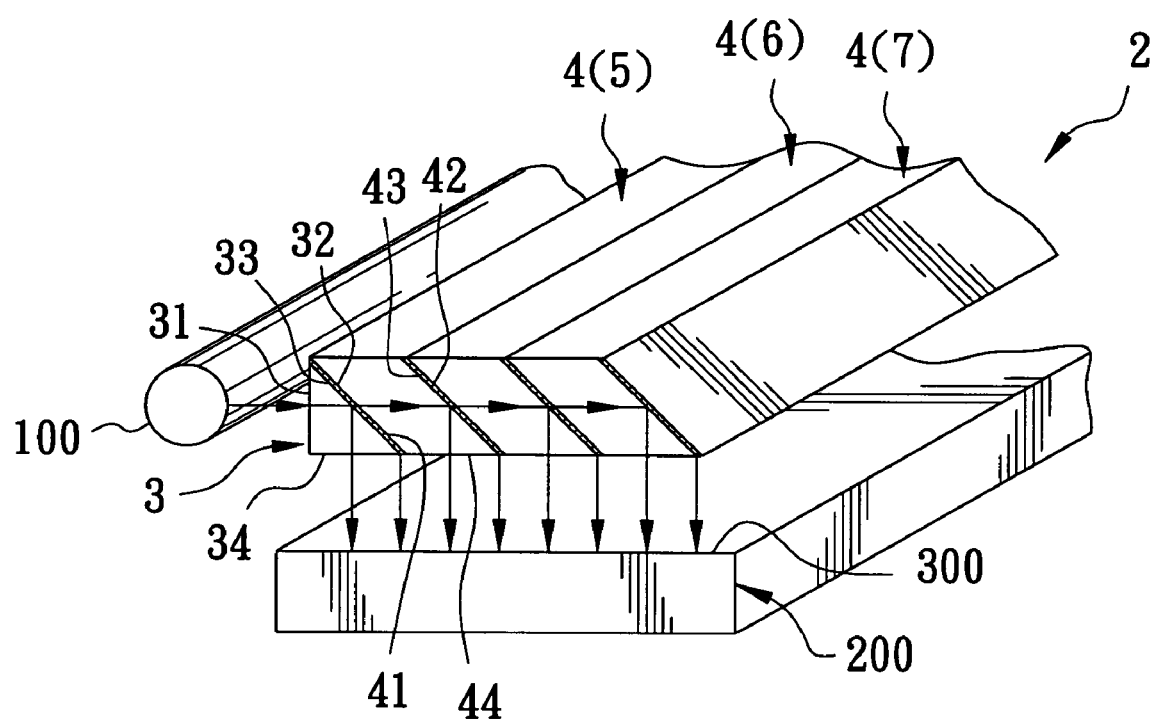
FIG. 2 is a perspective view of the first preferred embodiment of the light guide device according to this invention.

Referring to FIG. 2, the first preferred embodiment of a light guide device 2 having improved light efficiency and uniformity according to this invention is shown to guide a light incident from a light source 100 in a first direction toward an optical surface 300 of a liquid crystal panel 200.

The light guide device 2 is manufactured by using a light-transmissible material (such as plastic or glass) having a reflectance more than 1.3 as a primary material, and includes a first triangular prism unit 3 and a plurality of quadrate prism units 4. In the preferred embodiment, three quadrate prism units 4 are illustrated, which are connected optically to each other, and which are designated as a first quadrate prism unit 5, a second quadrate prism unit 6, and a third quadrate prism unit 7. The first triangular prism unit 3 is also connected optically to the first quadrate prism unit 5.

The first triangular prism unit 3 has a first light entrance side 31, a first light exit side 34 angled relative to the first light entrance side 31, and a first light transition interfacial side 32 angled relative to the first light entrance side 31 and the first light exit side 34. The first light transition interfacial side 32 has a coating 33 applied thereon. In the preferred embodiment, the first light entrance side 31 is perpendicular to the first light exit side 34. The first light entrance side 31 and the first light transition interfacial side 32 have an angle of 45° therebetween. That is, the first triangular prism unit 3 has a cross-sectional shape of a right-angled isosceles triangle.

The first light entrance side 31 permits the light from the light source 100 to pass therethrough and enter the first triangular prism unit 3. The coating 33 of the first light transition interfacial side 32 has a predetermined reflectance so that the first light transition interfacial side 32 reflects a portion of light incident thereon toward the first light exit side 34 and permits the other portion of the light to pass through the first light transition interfacial side 32 so as to enter the first quadrate prism unit 5. The portion of light reflected from the first light transition interfacial side 32 to the first light exit side 34 passes through the first light exit side 34 and reaches a portion of the optical surface 300 of the liquid crystal panel 200 corresponding to the first light exit side 34.

Each of the first, second and third quadrate prism units 5,6,7 has a cross-sectional shape of a parallelogram, and has a second light entrance side 41, a second light transition interfacial side 42 opposite to the second light entrance side 41, and a second light exit side 44 interconnecting the second light entrance side 41 and the second light transition interfacial side 42. The second light transition interfacial side 42 has a coating 43 applied thereon. The second light entrance side 41 and the second light transition interfacial side 42 are parallel to each other. The second light exit side 44 and the second light entrance side 41 have an angle of 45° therebetween. The second light exit side 44 and the second light transition interfacial side 42 have an angle of 135° therebetween. The first and second light exit sides 34, 44 are identical to each other in width. The first light transition interfacial side 32, the second light entrance side 41, and the second light transition interfacial side 42 are identical to each other in width.

The first quadrate prism unit 5 is proximate to the first triangular prism unit 3 and has the second light entrance side 41 in contact with the first light transition interfacial side 32. The second light transition interfacial side 42 of the second quadrate prism unit 6 is in contact with the second light entrance side 41 of the third quadrate prism unit 7. The first and second light exit sides 34,44 face the optical surface 300 of the liquid crystal panel 200. The first light transition interfacial side 32, the second light entrance sides 41, and the second light transition interfacial sides 42 are equal to each other in width. The first light exit side 34 and the second light exit sides 44 are coplanar. Therefore, the first triangular prism unit 3 is integrated with the first, second, and third quadrate prism units 5,6,7 to form a rectangular plate configuration parallel to the optical surface 300 of the liquid crystal panel 200.

The second light entrance side 41 of the first quadrate prism unit 5 is connected optically to the first light transition interfacial side 32 of the first triangular prism unit 3. The second light transition interfacial side 42 of the first quadrate prism unit 5 is connected optically to the second light entrance side 41 of the second quadrate prism unit 6. The second light transition interfacial side 42 of the second quadrate prism unit 6 is connected optically to the second light entrance side 41 of the third quadrate prism unit 7.

The coating of the second light transition interfacial side 42 of each of the first, second, and third quadrate prism units 5,6,7 has a predetermined reflectance so that the second light transition interfacial side 42 reflects a portion of light incident thereon toward the second light exit side 44 and permits the other portion of the light to pass through the second light transition interfacial side 42. The reflectance of the coatings 33,43 of the first and second light transition interfacial sides 32,42 are increased in a direction from the first triangular prism unit 3 to one of the quadrate prism units 4 which is farthest from the first triangular prism unit 3, i.e., the third quadrate prism unit 7 in the preferred embodiment. Therefore, the portion of light reflected from the second light transition interfacial side 42 to the second light exit side 44 passes through the second light exit side 44 and reaches a portion of the optical surface 300 of the liquid crystal panel 200 corresponding to the second light exit side 44. In the preferred embodiment, for example, the reflectance of the coating 33 of the first triangular prism unit 3 and the reflectance of the coatings 43 of the first, second, and third quadrate prism units 5,6,7 are 25%, 33.33%, 50%, and 100%, respectively.

During operation of the light guide device 2 of the preferred embodiment, when the light from the light source 100 reaches the first light transition interfacial size 32 coated with a coating 33, which has a reflectance of 25%, through the first triangular prism unit 3, three-fourths of the incident light passes through the first light transition interfacial side 32 and enters the first quadrate prism unit 5. One-fourth of the incident light is reflected by the first light transition interfacial size 32, exits the first triangular prism unit 3 through the first light exit size 34, and reaches a portion of the optical surface 300 of the liquid crystal panel 200 corresponding to the first light exit side 34.

Subsequently, when the light from the first triangular prism unit 3 reaches the second light transition interfacial size 42 of the first quadrate prism unit 5, one-half of the light from the light source 100 passes through the second light transition interfacial side 42 of the first quadrate prism unit 5 and enters the second quadrate prism unit 6 because the coating 43 on the second light transition interfacial size 42 of the first quadrate prism unit 5 has a reflectance of 33.33% (i.e., ⅓). One-fourth of the light from the light source 100 is reflected by the second light transition interfacial size 42 of the first quadrate prism unit 5 and exits the first quadrate prism unit 5 through the second light exit size 44 of the first quadrate prism unit 5, and reaches a portion of the optical surface 300 of the liquid crystal panel 200 corresponding to the second light exit side 44 of the first quadrate prism unit 5.

Subsequently, when the light from the first quadrate prism unit 5 reaches the second light transition interfacial size 42 of the second quadrate prism unit 6, one-fourth of the light from the light source 100 passes through the second light transition interfacial side 42 of the second quadrate prism unit 6 and enters the third quadrate prism unit 7 because the coating 43 on the second light transition interfacial size 42 of the second quadrate prism unit 6 has a reflectance of 50%. One-fourth of the light from the light source 100 is further reflected by the second light transition interfacial size 42 of the second quadrate prism unit 6 and exits the second quadrate prism unit 6 through the second light exit size 44 of the second quadrate prism unit 6, and reaches a portion of the optical surface 300 of the liquid crystal panel 200 corresponding to the second light exit side 44 of the second quadrate prism unit 6.

Finally, when the light from the second quadrate prism unit 6 reaches the second light transition interfacial size 42 of the third quadrate prism unit 7, the remaining one-fourth of the light from the light source 100 is reflected fully by the second light transition interfacial size 42 of the third quadrate prism unit 7 because the coating 43 on the second light transition interfacial size 42 of the third quadrate prism unit 7 has a reflectance of 100%. The light reflected by the second light transition interfacial size 42 of the third quadrate prism unit 7 exits the third quadrate prism unit 7 through the second light exit size 44 of the third quadrate prism unit 7, and reaches a portion of the optical surface 300 of the liquid crystal panel 200 corresponding to the second light exit side 44 of the third quadrate prism unit 7.

It should be noted that the aforesaid preferred embodiment is illustrated on a basis of uniform illumination for the optical surface 300 of the liquid crystal panel 200 according to the best mode of this invention, in which the coatings 33,43 have optimal reflectance, and in which the first triangular prism unit 3, and the quadrate prism units 4 have cross-sectional shapes of a right-angled isosceles triangle and a parallelogram, respectively. However, the reflectance of the coatings 33,43 and the configurations of the first triangular prism unit 3 and the quadrate prism units 4 can be varied by skilled artisans to meet the specific requirements without departing from the spirit and scope of this invention.

Since the light for the liquid crystal panel 200 should be a specifically polarized light, for example, a p-type light, the first light entrance side 31 of the first triangular prism unit 3 can be further coated with a polarizing coating for filtering and permitting light components having the same polarization to enter the first triangular prism unit 3. Although the amount of the light passing through the polarizing coating is decreased to one-half, the light efficiency and uniformity for the optical surface 300 of the liquid crystal panel 200 can be improved by the light guide device 2 of this invention.

Alternatively, the polarizing can be effected by polarizing the coating 33 of the first triangular prism unit 3 or the coatings 43 of the quadrate prism units 4 for filtering and permitting light components having the same polarization to reach the optical surface 300 of the liquid crystal panel 200. Additionally, the light components having the other polarization will exit through the sides of the first triangular prism unit 3 and the quadrate prism units 4 opposite correspondingly to the first light exit side 34, and the second light exit sides 44, respectively.

Furthermore, in view of the aforesaid, if the number of the quadrate prism units 4 is n, the reflectance of the coating 33 of the first triangular prism unit 3 is $1/(n+1)$, and the reflectance of the coatings 43 of the quadrate prism units 4 are sequentially $1/((n+1)-1)$, $1/((n+1)-2)$, $1/((n+1)-3)$ ... $1/((n+1)-n)$. n is an integer not less than 2.

Figure 3:
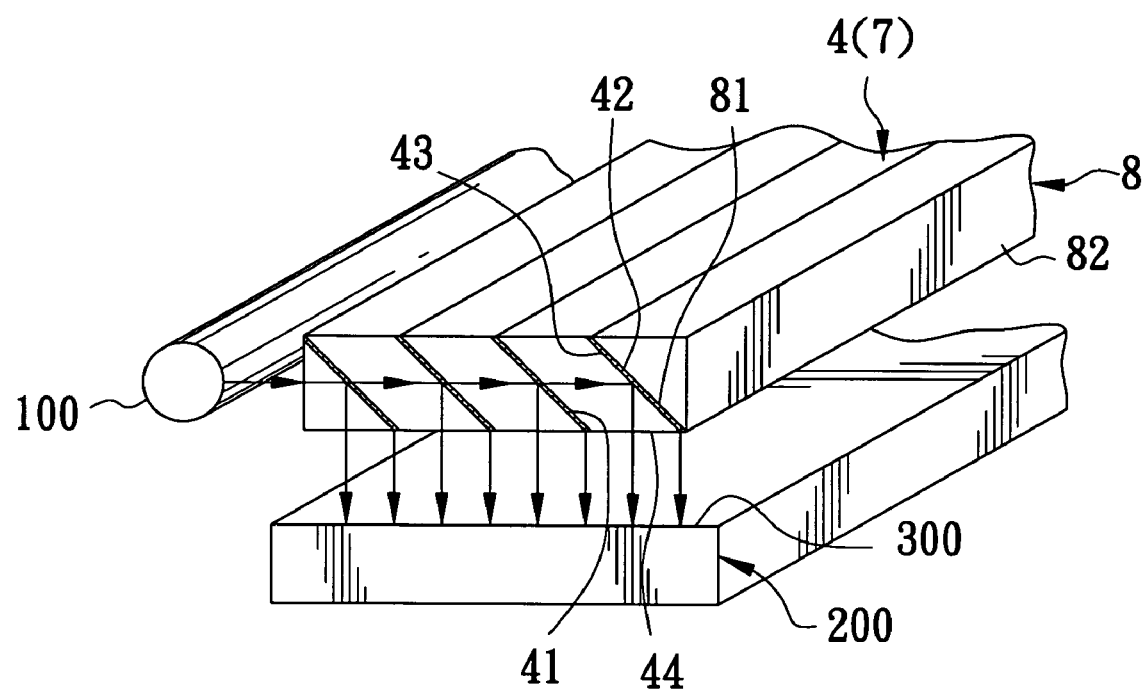
FIG. 3 is a perspective view of the second preferred embodiment of the light guide device according to this invention.

Referring to FIG. 3, the second preferred embodiment of the light guide device according to this invention is shown to be similar to the first preferred embodiment except that the light guide device in the second preferred embodiment further includes a second triangular prism unit 8 connected optically to one of the quadrate prism units 4 farthest from the first triangular prism unit 3, i.e. the third quadrate prism unit 7 in the preferred embodiment. Likewise, the second triangular prism unit 8 has a cross-sectional shape of a right-angled isosceles triangle, and has a third light entrance side 81 in contact with the second light transition interfacial side 42 of the third quadrate prism unit 7 and a black light absorbing side 82 for blocking the light from exiting therefrom. The light entrance side 81 is identical in width to the second light transition interfacial side 42. The third light entrance side 81 and the light absorbing side 82 have an angle of 45° therebetween.

In view of the aforesaid, the polarization and the amount of the light traveling to the optical surface 300 of the liquid crystal panel 200 can be controlled by regulating the polarization and the reflectance of the coatings 33,43 on the first triangular prism unit 3 and the quadrate prism units 4. Therefore, the light efficiency and uniformity for the optical surface 300 of the liquid crystal panel 200 can be improved through the use of the light guide device of this invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A light guide device for guiding a light incident in a first direction toward an optical surface, said light guide device comprising:
    a first triangular prism unit having a first light entrance side, a first light exit side angled relative to said first light entrance side, and a first light transition interfacial side angled relative to said first light entrance side and said first light exit side, said first light transition interfacial side having a coating applied thereon; and
    a plurality of quadrate prism units connected optically to said first triangular prism unit and each having a second light entrance side, a second light transition interfacial side opposite to said second light entrance side, and a second light exit side interconnecting said second light entrance side and said second light transition interfacial side, said second light transition interfacial side having a coating applied thereon,
    said quadrate prism units including a proximal quadrate prism unit which is proximate to said first triangular prism unit and which has said second light entrance side in contact with said first light transition interfacial side,
    each of said quadrate prism units having said second light transition interfacial side in contact with said second light entrance side of the other one of said quadrate prism units except said proximal quadrate prism unit, said first and second light exit sides being adapted to face the optical surface,
    said coating of said first or second light transition interfacial side having a predetermined reflectance so that said first or second light transition interfacial side reflects a portion of light incident thereon toward said first or second light exit side and permits the other portion of the light to pass through said first or second light transition interfacial side,
    said reflectance of said coatings of said first and second light transition interfacial sides being increased in a direction from said first triangular prism unit to one of said quadrate prism units which is the farthest from said first triangular prism unit,
    wherein the number of said quadrate prism units is n, said reflectance of said coating of said first triangular prism unit is $1/(n+1)$, and said reflectance of said coatings of said quadrate prism units are sequentially $1/((n+1)-1)$, $1/((n+1)-2)$, $1/((n+1)-3)$ ... $1/((n+1)-n)$, wherein n is an integer not less than 2.

2. The light guide device as claimed in claim 1, wherein said first light entrance side is perpendicular to said first light exit side, said first light entrance side and said first light transition interfacial side having an angle of 45° therebetween.

3. The light guide device as claimed in claim 2, wherein said first light transition interfacial side, said second light entrance side, and said second light transition interfacial side are equal to each other in width, and wherein said first light exit side and said second light exit side are coplanar.

4. The light guide device as claimed in claim 1, wherein said first light entrance side of said first triangular prism unit further includes a polarizing coating for filtering and permitting light components having the same polarization to enter said first triangular prism unit.

5. The light guide device as claimed in claim 1, wherein said coating of said first triangular prism unit is a polarizing coating for filtering and permitting light components having the same polarization to pass through said first light transition interfacing side.

6. The light guide device as claimed in claim 1, wherein said coating of each of said quadrate prism units is a polarizing coating for filtering and permitting light components having the same polarization to pass through said second light transition interfacial side.

7. The light guide device as claimed in claim 1, further comprising a second triangular prism unit connected optically to one of said quadrate prism units farthest from said first triangular prism unit, and having a third light entrance side in contact with said second light transition interfacial side of said farthest one of said quadrate prism units and a light absorbing side for blocking the light from exiting therefrom.

8. The light guide device as claimed in claim 7, wherein said third light entrance side is identical in width to said second light transition interfacial side, said third light entrance side and said light absorbing side having an angle of 45° therebetween.

* * * * *